(12) United States Patent
Valencia Carrio et al.

(10) Patent No.: US 9,849,916 B2
(45) Date of Patent: Dec. 26, 2017

(54) BEAMS WITH U-SHAPED CROSS-SECTION

(71) Applicant: AUTOTECH ENGINEERING A.I.E., Amorebieta-Etxano (ES)

(72) Inventors: Xavier Valencia Carrio, Manresa (ES); Sergi Marquez Duran, Rajadell (ES); Lluis Espana De Juan, Llica de Vall (ES); Christophe Cazes, Versailles (FR); Gregory Gatard, Leuville sur Orge (FR); Vincent Barelli, La Ville du Bois (FR); Emmanuel Leroy, Verrieres le Buisson (FR); Matthieu Dunand, Paris (FR); Matthieu Niess, Clamart (FR)

(73) Assignee: AUTOTECH ENGINEERING A.I.E., Amorebieta-Etxano (ES)

( * ) Notice: Subject to any disclaimer, the term of this patent is extended or adjusted under 35 U.S.C. 154(b) by 0 days.

(21) Appl. No.: 15/035,207

(22) PCT Filed: Nov. 14, 2014

(86) PCT No.: PCT/EP2014/074607
§ 371 (c)(1),
(2) Date: May 6, 2016

(87) PCT Pub. No.: WO2015/071412
PCT Pub. Date: May 21, 2015

(65) Prior Publication Data
US 2016/0288840 A1     Oct. 6, 2016

(30) Foreign Application Priority Data

Nov. 15, 2013 (FR) ........................................ 1361220
Apr. 7, 2014 (EP) ..................................... 14382133

(51) Int. Cl.
*B62D 21/15* (2006.01)
*B62D 25/04* (2006.01)
(Continued)

(52) U.S. Cl.
CPC .............. *B62D 25/04* (2013.01); *B60R 19/18* (2013.01); *B62D 21/15* (2013.01); *B62D 21/157* (2013.01);
(Continued)

(58) Field of Classification Search
CPC ...... B62D 25/02; B62D 25/025; B62D 25/04; B62D 21/157; B62D 21/15157; B60R 19/18; B60R 2019/1806; B60R 2019/1813
(Continued)

(56) References Cited

U.S. PATENT DOCUMENTS 6,474,726 B1 * 11/2002 Hanakawa ........... B62D 29/002
296/187.12
6,607,239 B1 * 8/2003 Fuji ........................ B60R 22/24
296/203.03
(Continued)

FOREIGN PATENT DOCUMENTS

DE       10007358 A1    8/2001
EP        1190938 A2    3/2002
(Continued)

OTHER PUBLICATIONS

PCT/EP2014/074607 International Search Report.
PCT/EP2014/074607 International Written Opinion of the International Searching Authority.

*Primary Examiner* — Gregory Blankenship
(74) *Attorney, Agent, or Firm* — Squire Patton Boggs (US) LLP

(57) ABSTRACT

A beam comprising a first portion having a U-shaped cross-section, wherein the U-shape comprises a bottom and
(Continued)

a first and a second side wall extending substantially perpendicular to the bottom, and wherein the first and/or the second side wall comprises a first substantially straight portion, a second substantially straight portion and a side transition zone between the first and the second substantially straight portion. The disclosure further relates to bumpers, rocker panels, side impact beams and B-pillars comprising such beams and to vehicles incorporating such components.

16 Claims, 9 Drawing Sheets

(51) Int. Cl.
   B60R 19/18         (2006.01)
   B62D 25/02         (2006.01)
(52) U.S. Cl.
   CPC .... B62D 25/025 (2013.01); *B60R 2019/1806* (2013.01)
(58) Field of Classification Search
   USPC ........................................ 296/193.06, 203.02
   See application file for complete search history.

(56) References Cited

U.S. PATENT DOCUMENTS

| | | | | |
|---|---|---|---|---|
| 8,393,672 | B2* | 3/2013 | Mori | B23K 26/24 296/187.12 |
| 8,491,047 | B1* | 7/2013 | Moll | B62D 25/04 296/193.06 |
| 9,616,935 | B2* | 4/2017 | Schnug | B62D 25/04 |
| 2002/0063444 | A1* | 5/2002 | Kim | B62D 25/081 296/203.02 |
| 2003/0227182 | A1 | 12/2003 | Yoshida et al. | |
| 2005/0285416 | A1 | 12/2005 | Heatherington et al. | |
| 2008/0093892 | A1* | 4/2008 | Chen | B62D 25/025 296/203.03 |
| 2011/0133515 | A1* | 6/2011 | Mori | B62D 21/157 296/193.06 |
| 2011/0233970 | A1* | 9/2011 | Nagai | B62D 25/02 296/203.03 |
| 2013/0020833 | A1* | 1/2013 | Yao | B60R 22/24 296/193.06 |
| 2013/0187410 | A1* | 7/2013 | Wawers | B62D 21/157 296/193.06 |
| 2015/0115654 | A1* | 4/2015 | Honda | B62D 29/002 296/187.12 |
| 2015/0175211 | A1* | 6/2015 | Shinoda | B62D 25/04 296/193.06 |
| 2015/0291218 | A1* | 10/2015 | Yoshida | B62D 25/04 296/187.12 |
| 2016/0023683 | A1* | 1/2016 | Nishimura | B62D 25/02 296/187.12 |
| 2016/0039470 | A1* | 2/2016 | Sakuragi | B62D 21/157 296/193.06 |
| 2016/0059894 | A1* | 3/2016 | Ohhara | B62D 21/157 296/193.06 |
| 2016/0280270 | A1* | 9/2016 | Valencia Carrio | B62D 25/025 |
| 2016/0288840 | A1* | 10/2016 | Valencia Carrio | B62D 25/025 |
| 2017/0036701 | A1* | 2/2017 | Yamada | B62D 21/157 |

FOREIGN PATENT DOCUMENTS

| | | |
|---|---|---|
| EP | 1498345 A2 | 1/2005 |
| GB | 2497396 A | 6/2013 |
| JP | S5841671 U | 9/1956 |
| JP | H796857 A | 4/1995 |
| JP | 20049917 A | 1/2004 |
| JP | 2011218952 A | 11/2011 |
| WO | WO 2012/090042 | 7/2012 |

* cited by examiner

Section D-D

Section A-A

Section C-C

Section B-B

Section D-D

Section A-A

Section C-C

Section B-B

Section D-D

Section A-A

Section C-C

Section B-B

BEAMS WITH U-SHAPED CROSS-SECTION

This application claims the benefit of European Patent Application EP14382133.8 filed Apr. 7, 2014 and French Patent Application FR 1361220 filed Nov. 15, 2013.

The present disclosure relates to beams including a portion having a substantially u-shaped cross-section. The present disclosure further relates to bumpers, rocker panels, side impact beams, and b-pillars and further to vehicles, such as cars comprising such components.

BACKGROUND

Vehicles such as cars incorporate a structural skeleton designed to withstand all loads that the vehicle may be subjected to during its lifetime. The structural skeleton is further designed to withstand and absorb impacts, in case of e.g. collisions with other cars.

The structural skeleton of a car in this sense may include e.g. a bumper, pillars (A-pillar, B-Pillar, C-Pillar), side impact beams, a rocker panel, and shock absorbers. These components may incorporate a beam and additional plates around such a beam. It is known to use beams having a substantially U-shaped (or "hat"-shaped cross section). Such beams may be manufactured in a variety of ways, and may be made of a variety of materials.

For the structural skeleton of a car, or at least for a number of its components, it has become commonplace in the automotive industry to use so-called ultra-high strength steels (UHSS), which exhibit an optimized maximal strength per weight unit and advantageous formability properties.

Some of these steels, such as e.g. 22MnB5 steel, are designed to attain a microstructure after heat treatment, which confers good mechanical properties and makes them especially suited for the hot stamping process used to form steel blanks into particular automobile parts. In order to avoid the decarburization and the scale formation during the forming process, 22MnB5 is presented with an aluminum-silicon coating. Usibor® 1500P, commercially available from Arcelor Mittal, is an example of a steel used in various components, possibly involving so-called tailored and patchwork blanks.

Usibor® 1500P is supplied in ferritic-perlitic phase. It is a fine grain structure distributed in a homogenous pattern. The mechanical properties are related to this structure. After heat treatment during hot stamping process, a martensite microstructure is created. As a result, maximal strength and yield strength increase noticeably.

A typical hot stamping process may include heating a blank of flat steel in a furnace to an austenitic state and hot forming the blank between a cooled pair of tools (e.g. in a die). The blank may be maintained between the tools until the blank has hardened and has rapidly cooled down. An essentially martensitic structure with a tensile strength of more than 1.300 Mpa, e.g. approximately 1.500 Mpa can be obtained.

The use of beams having a relatively thin-walled U-shaped cross-section may be advantageous since they can be manufactured using e.g. hot stamping processes and because they provide good bending stiffness per unit weight and thus enable improved performance under bending and in compression. As mentioned before, in some implementations, additional platework may be provided, e.g. a cover plate "closing" the U-shaped cross-section. Such a closed cross-section may improve stiffness of the resulting component.

In examples of the present disclosure, beams having a substantially U-shaped cross-section with improved properties are provided.

SUMMARY

In a first aspect, a beam is provided comprising a first portion having a substantially U-shaped cross-section, wherein the U-shape comprises a bottom and a first and a second side wall. The first and/or the second side wall comprises a first substantially straight portion, a second substantially straight portion and a side transition zone between the first and the second substantially straight portion.

According to this aspect, a beam having improved deformation properties and control of collapse may be obtained. When subjected to a bending load, which may be caused by an impact, the side walls of a standard U-shaped cross-section may collapse under buckling. According to this aspect, the first and/or second side wall comprises a side transition zone between a first straight portion and a second straight portion of the side walls. This side transition zone in a way interrupts the side walls. The buckling behavior of the side walls may thus be changed: the buckling load may be increased and the deformation under buckling is changed as well.

A beam that may have a varying cross-section along its length and incorporates such a side transition zone in one or both of the side walls is made possible by modern hot stamping techniques. It has been found that the weight of a component, such as e.g. a B-pillar may be significantly decreased (e.g. in an order of magnitude of 5-10%) by incorporating such side transition zones while maintaining or improving the behavior under impact, i.e. the behavior during deformation.

The transition zone may assume a variety of shapes as long as the buckling of the side walls is influenced with respect to substantially straight side walls.

In some examples, the U-shaped cross-section further comprises a first side flange extending from the first side wall, and/or a second side flange extending from the second side wall. Such side flanges may be substantially parallel to the bottom of the "U". The inclusion of side flanges on the one hand has an influence on the moment of inertia and thus on the bending stiffness, and on the other hand, the side flanges may serve for attachment of plates or other components.

In some examples, the bottom of the substantially U-shaped cross-section may comprise a stiffening rib. Such a stiffening rib may include a portion that is curved inwards. Such a rib may cause the U-shaped cross-section to crack in a controlled manner. If, in the case of impact and collapse of the structure, a beam cracks, it is desirable that crack propagation occurs in a controlled manner. The rib can ensure that cracking occurs at the bottom, and furthermore, the crack behavior of such a U-beam is influenced by the side transition zones. Because of the side transition zones, it may be achieved that when the bottom cracks, the crack only extends along the bottom portion of the U-shape, and does not go beyond the bottom. This may increase passenger safety in the case of a collision.

In some examples, a first and/or a second side flange may comprise a flange transition zone, i.e. the side flanges are not substantially straight portions. Such flange transition zones may increase the moment of inertia around the bending neutral axis.

In some examples, the beam may further comprise a second portion having a U-shaped cross-section wherein the U-shape comprises a bottom and a first and a second side wall extending substantially perpendicular to the bottom, the side walls not having a side transition zone. In some further examples, the beam may further comprise a third portion having a U-shaped cross-section wherein the U-shape comprises a bottom and a first and a second side wall extending substantially perpendicular to the bottom, and wherein the first and/or the second side wall comprises a first substantially straight portion, a second substantially straight portion and a side transition zone between the first and the second substantially straight portion. Thus a beam with different portions, with different cross-sectional properties can be provided.

In these examples, the U-shaped cross-section with sidewalls having side transition zones may not be provided along the entire length of the beam. In the case of for example a B-pillar, strength and stiffness requirements and deformation requirements are only a selection of all design requirements. A B-pillar needs to be complementary to the shape of a car door for example. To this end, on the exterior side of a central beam (sometimes referred to as a "central B-pillar") an exterior cover plate may be provided that is adapted to a car door. But the dimensions of the central beam need adaptation along its length to properly support such a cover plate. Additionally, on an interior side of the B-pillar, i.e. a passenger side, cushions, rubbers, fabrics according to an interior design may need to be fitted. To this end, on the interior side of the central beam, one or more interior cover plates and trim panels may be provided. Again, the dimensions and shape of the central beam need to properly support and fit with such an interior plates along the length of the B-pillar.

A B-pillar may further need to fit a door locking system for example. Such a door lock may require a substantially flat surface, and in particular a substantially straight sidewall of a U-shaped cross-section. Along the length of the B-pillar, the shape and dimensions of the U-shaped cross-section may thus vary.

The requirements may vary from one type of car to another type. In some cases, an improved B-pillar may be obtained by providing a first portion having a U-shaped cross-section with side transition zones, a second portion that does not have such transitions (e.g. to fit a door lock), and a third portion that again has such side transition zones.

In another aspect, a B-pillar comprising a beam according to any of the examples as herein disclosed is provided. In particular, a central B-pillar may be such a beam. In further aspects, bumpers, rocker panels and side impact beams incorporating any of the examples of the beams as herein disclosed are provided.

BRIEF DESCRIPTION OF THE DRAWINGS

Non-limiting examples of the present disclosure will be described in the following, with reference to the appended drawings, in which:

FIG. 1b schematically illustrates a number of cross-sections of the example of the central beam of FIG. 1a;

FIG. 2b schematically illustrates a number of cross-sections of the example of the central beam of FIG. 2a;

FIGS. 4b and 4c schematically illustrate two cross-sections of the bumper beam of FIG. 4a.

DETAILED DESCRIPTION OF EXAMPLES

Figure 1A:
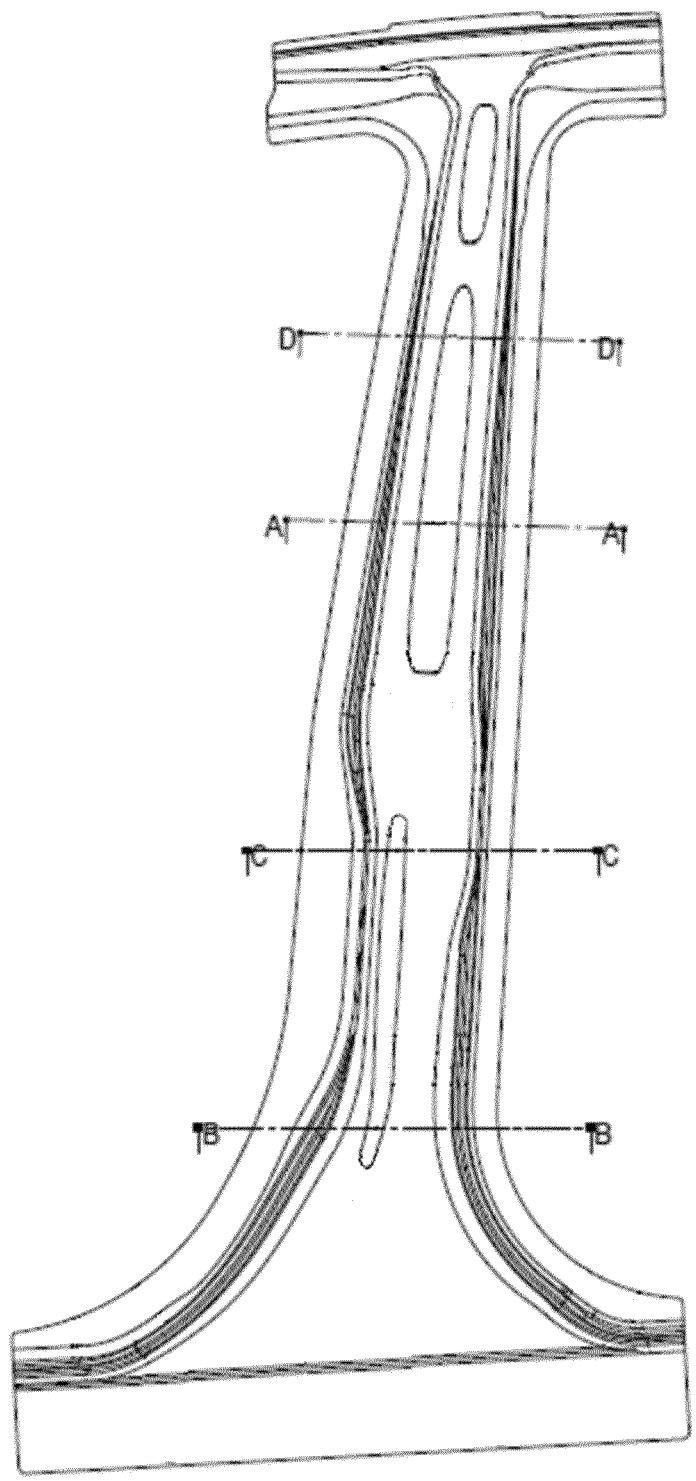
FIG. 1a schematically illustrates an example of a central beam of a B-pillar according to an implementation.
Figure 1B:
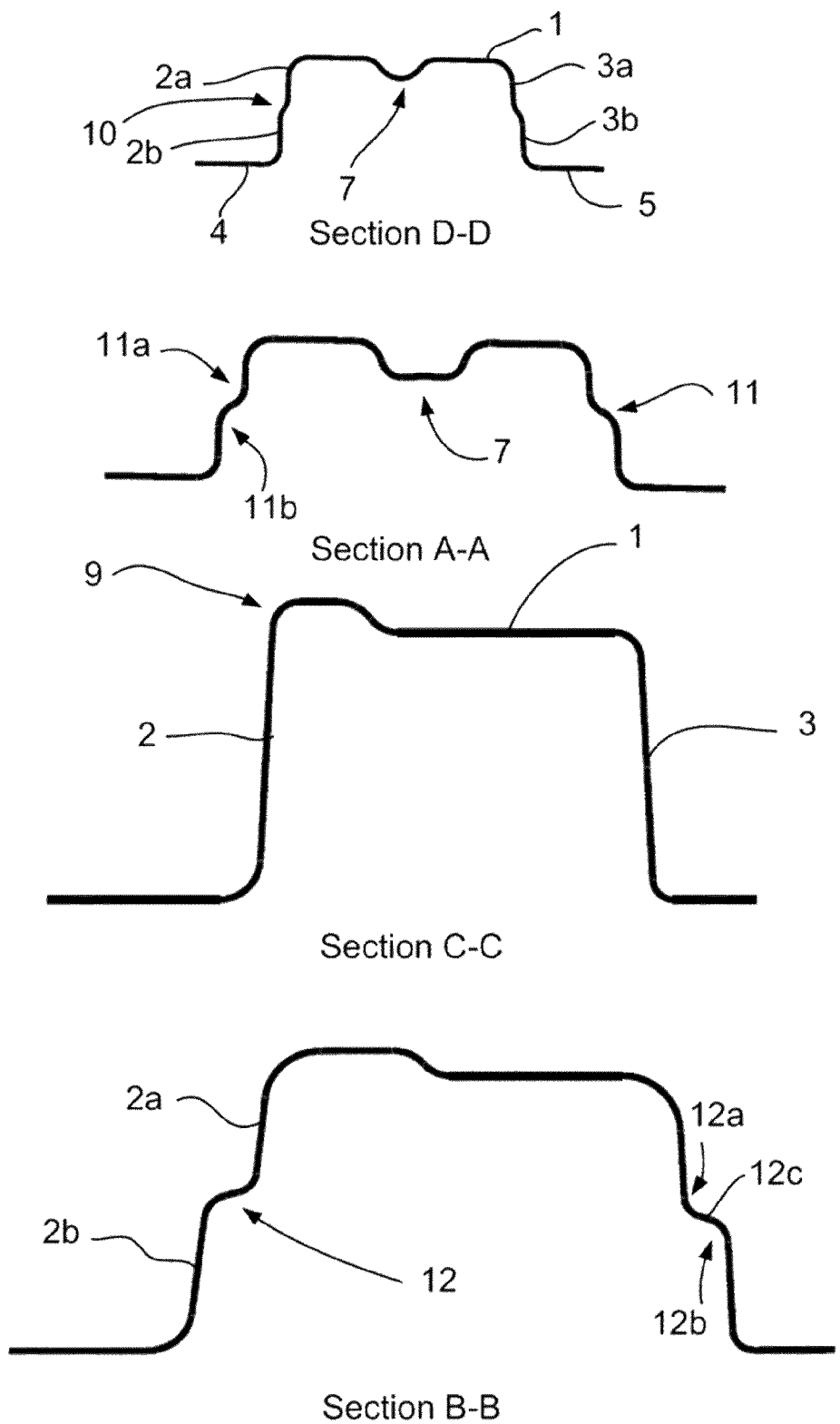

FIG. 1a schematically illustrates an example of a central beam of a B-pillar according to an implementation. In FIG. 1a, lines A-A, B-B, C-C and D-D are indicated. FIG. 1b schematically illustrates cross-sections of the example of the central beam of the B-pillar according to FIG. 1a along these lines.

A central beam of a B-pillar such as the one illustrated in FIG. 1a may be made from an Ultra High Strength Steel, such as Usibor 1500. A hot stamping process may be used for its manufacturing. A so-called soft-zone (not further illustrated) may be provided along a portion of the beam. A soft zone is a portion of the beam that has increased ductility and deformability.

A (central) B-pillar may generally comprise a central portion which widens both towards an upper end and towards a lower end. Such a central portion may extend along approximately 70% of the length of the B-pillar, whereas the wider lower end may extend along approximately 20% and the wider upper end may extend along approximately 10% of the length of the B-pillar. These wider portions are sometimes referred to as "lower gusset" and "upper gusset" respectively.

Several cross-sections at different heights of the beam of FIG. 1a are illustrated in FIG. 1b. The same reference signs have been used throughout the figures to indicate the same (or very similar) components. In order not to obscure all the drawings, not all reference signs have been repeated in each of the depicted cross-section.

At section D-D, the beam may have a substantially U-shaped cross-section, wherein the "U" comprises a bottom portion 1, a first side wall 2, and a second side wall 3. The side walls may be substantially perpendicular to the bottom. Generally complete perpendicularity will not be achieved due to the need of removing the beam from a mold (or die).

The first side wall 2 may comprise a first side portion 2a, and a second side portion 2b and a side transition zone 10 between the first and second side portions. The first side portion 2a extends from one end of the bottom portion towards the transition zone. The second side portion 2b extends from the transition zone towards a side flange 4. Equally, the second side wall 3 may have such first and second side portions 3a and 3b and a side transition zone 10 between them. Another side flange may be provided at the end of the second side wall 3.

The side flanges 4 and 5 may be substantially parallel to the bottom portion 1. The side flanges may be provided in order to facilitate mounting of several items including e.g. an interior cover plate, i.e. a plate on the interior side or passenger side of the B-pillar.

The side transition zone 10 along section D-D may comprise a substantially straight portion that is not parallel to the first and second side portions 2a and 2b, whereas these two side portions are substantially parallel. The side transition zone may thus be inclined (i.e. not horizontal), but with a different inclination than the first and second straight portions of the side wall. Similar arrangements may be seen in section A-A and section B-B.

The bottom of the U-shape along section D-D comprises a stiffening rib in the form of an inwardly curved portion. Inwardly herein is to be understood as inwardly with respect to the U-shape.

A different cross-section is shown for section A-A. Firstly, the U-shaped cross-section is significantly wider than the cross-section for line D-D. Secondly, the shape of the stiffening rib 7 may be different along section A-A. Furthermore, the side transition zones 11 in this case may comprise a first fillet radius 11a, and a second fillet radius 11b. In one practical example, such radii may be e.g. 5 mm each.

Along section C-C, the beam may have a substantially U-shaped cross-section, but the side walls 2 and 3 do not comprise any side transition zones. A portion of the central B-pillar may thus be adapted for the inclusion of a door lock. Such a door lock may require a substantially flat surface of side wall 2.

Along section B-B, again a substantially U-shaped cross-section may be provided. However, along this section, the side transition zones 12 may again be different from the side transition zones depicted for section D-D and section A.A. In the various examples shown so far, it may be seen that the side transition zone is relatively short as compared to e.g. the bottom of the U-shape. The width of each side transition zone may preferably be less than 20% of the width of the bottom of the U-shape and optionally may be from 5%-15%, or approximately 10% or less of the width of the bottom of the U-shape. Width herein is defined as the dimension of the transition zone (and bottom) that is perpendicular to the height of the cross-section. The width of the bottom defined herein is the width between the connections of the bottom to the side walls. The side transition zone 12 in this case may comprise a first fillet radius 12a, a second fillet radius 12b and a substantially straight portion 12c in between. Such a substantially straight portion may be not parallel to either the bottom of the U or to the first and second side portions of the side walls.

It has been found that a B-pillar incorporating such a central beam as schematically illustrated in FIGS. 1a and 1b may achieve a weight reduction as compared to a central beam that does not have the side transition zones, while satisfying the strength, stiffness and in particular deformation requirements and kinematic behavior. The deformation requirements under impact are particularly important for a B-pillar: as it deforms, it moves inwards, i.e. in the direction of the passengers. In order to improve safety for passengers, strict requirements as to how far inwards the beam is allowed to move have to be complied with. Movement of the beam inwards also means that energy of an impact is being absorbed. If more energy is absorbed by such a movement, less energy needs to be deformed by deformation and rupture. The side transition zones help e.g. a B-pillar to absorb high levels of energy while avoiding too much intrusion towards the passengers.

The weight saving may be achieved by reducing the thickness of the beam, e.g. along portions of the beam. Patchwork blanks may be used accordingly. Another way in which weight saving may be obtained is that e.g. the portions of the beam along which an interior plate has to be provided may be reduced. For example, an interior plate may only need to be provided along an upper portion of the B-pillar and a lower portion of the B-pillar. This may have a further effect in that material use may be reduced.

Although the height of the transition zone of the side walls has generally been indicated in sections D-D, A-A and B-B at substantially the same height, around 50% of the height, this does not necessarily need to be the case. On the one hand, the specific height of the side transition zones may be varied along the length of the beam. On the other hand, the side transition zones may be placed between 50-90% of the height, in some cases between 60-80% of the height of the U-shape. For a lower portion of the B-pillar, i.e. the portion where an impact may occur and the portion that is highest (and possibly widest), it has been found that side transition zones between 60%-80% of the height, and in particular around 70% of the height are beneficial. Herein 0% of the height is understood to be at the height of the side flanges (where the side flanges connect with the side walls) and 100% is to be understood as the height of the bottom portion of the U-shape.

In some examples, it may be advantageous to provide the side transition zones closer to the bottom of the U-shape. When the side walls buckle and the first side wall portion buckles inwards, it may make contact with the bottom portion of the U-shape and may thus support the bottom portion. This may improve the deformation behavior.

Figure 1C:
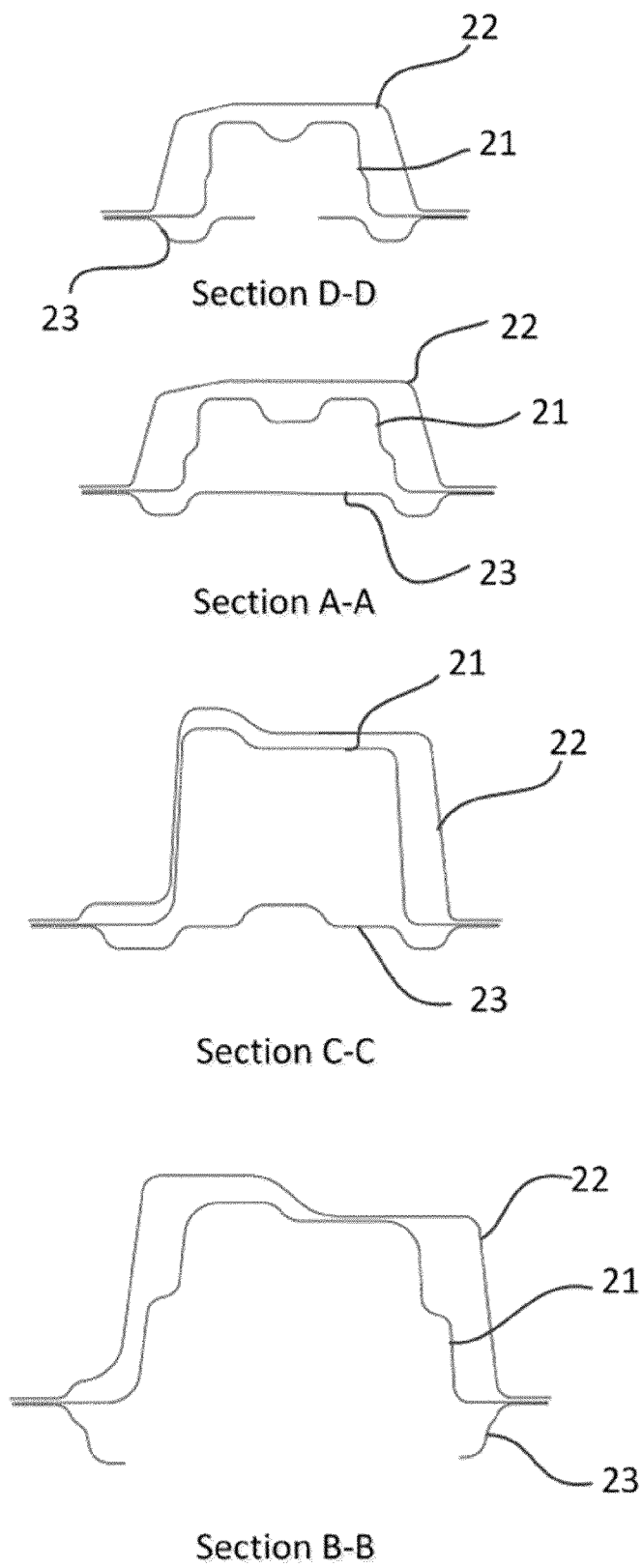
FIG. 1c schematically illustrates a number of cross-sections of the example of the central beam of FIG. 1a with internal and external plates.

FIG. 1c schematically illustrates that a B-pillar in some examples may comprise a central beam 21, an external plate 22 and an internal plate 23. The internal plate 23 may serve for attaching parts of a car's interior. The external plate 22 may serve particularly for providing a complementary shape to a car door.

Both an internal plate and an external plate, depending on the specific implementation, may contribute to the structural strength and stiffness of the resulting B-pillar.

Figure 2A:
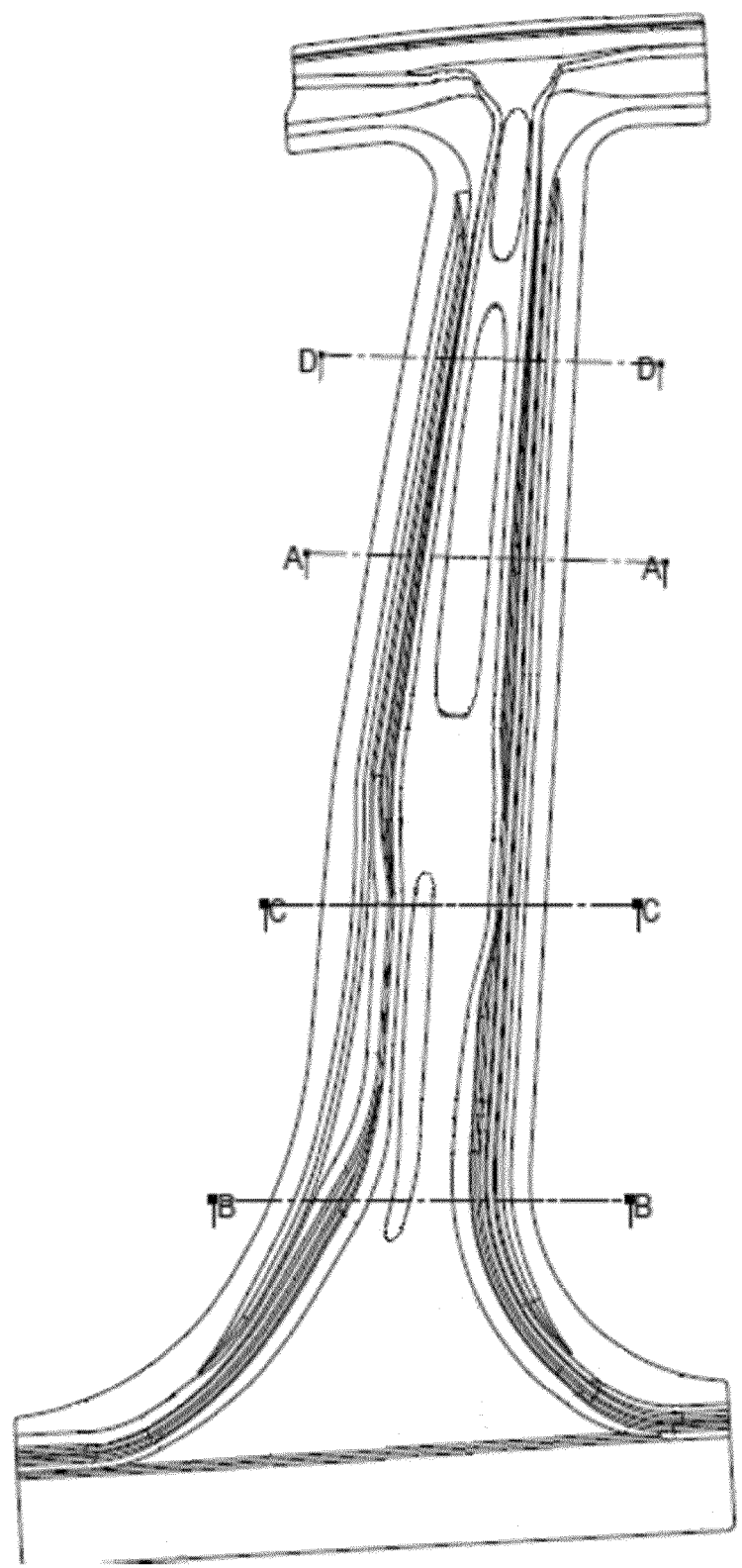
FIG. 2a schematically illustrates another example of a central beam of a B-pillar according to an implementation.

FIG. 2a schematically illustrates another example of a central beam of a B-pillar according to an implementation. Various cross-sections along the lines indicated in FIG. 2a are shown in FIG. 2b.

Again, same reference signs as already indicated in FIG. 1b have been used for indicating same or very similar components. Again, not in all the figures, all the reference signs have been included, in order not to obscure the drawings.

Figure 2B:
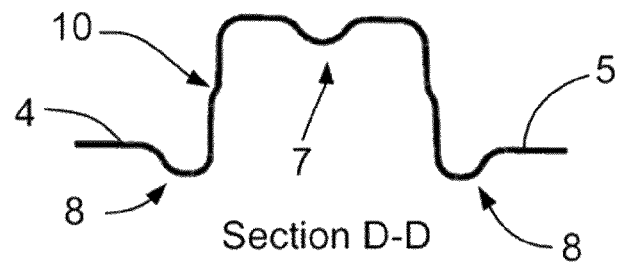
Figure 2B:
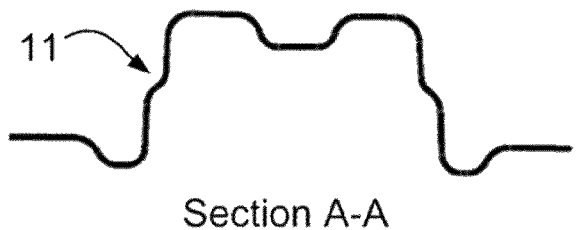
Figure 2B:
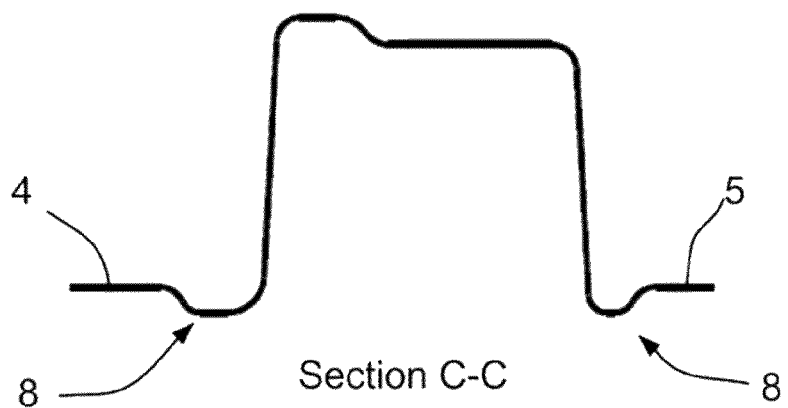
Figure 2B:
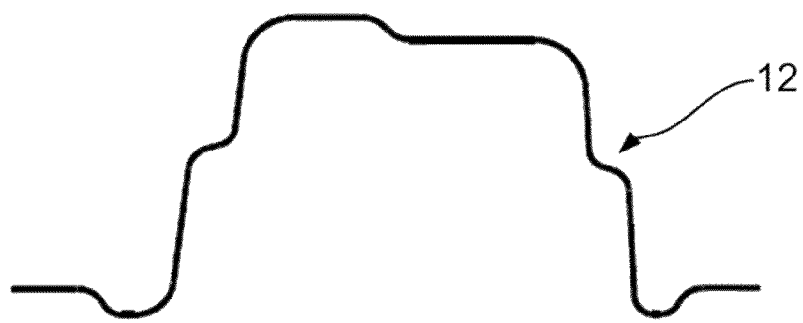

The sections A-A, B-B, C-C and D-D of FIG. 2b are generally quite comparable to the sections shown in FIG. 1b. A main difference is that a flange transition zone 8 is provided between a substantially straight portion of side flanges 4 and 5 and the first and second side walls respectively. The side walls may extend beyond the side flanges 4 and 5. Such a flange transition zone may comprise a concavity that is open towards the bottom portion of the U-shape.

Similar flange transition zones may be provided along sections A-A, C-C and B-B. Again, the width of the transition zone may generally be 10% or less of the width of the bottom of the U-shape. For each of these sections, the moment of inertia around the neutral bending axis may be changed and the behavior under a bending moment can thus be improved. In combination with the side transition zones 10, 11 and 12, it has been found that given the same structural requirements and impact requirements, the weight of the U-beam may be significantly reduced. A synergistic effect is provided by the combination of the flange transition zones and the side transition zones, as the side transition zones enable redistributing resistance to bending moments over different cross-sections. Due to the flange transition zones, the height of the side walls increases, which would make the side walls more prone to buckling. The side transition zones compensate for this. A resulting B-pillar may thus have a reduced weight.

In the example of FIGS. 1b and 2b, a beam thus comprises a first portion with substantially U-shaped cross-section with side transition zones, a second portion having a U-shaped cross-section wherein the side walls do not have a side transition zone (around section C-C), and a third portion with substantially U-shaped cross-section with side transition zones.

Figure 3A:
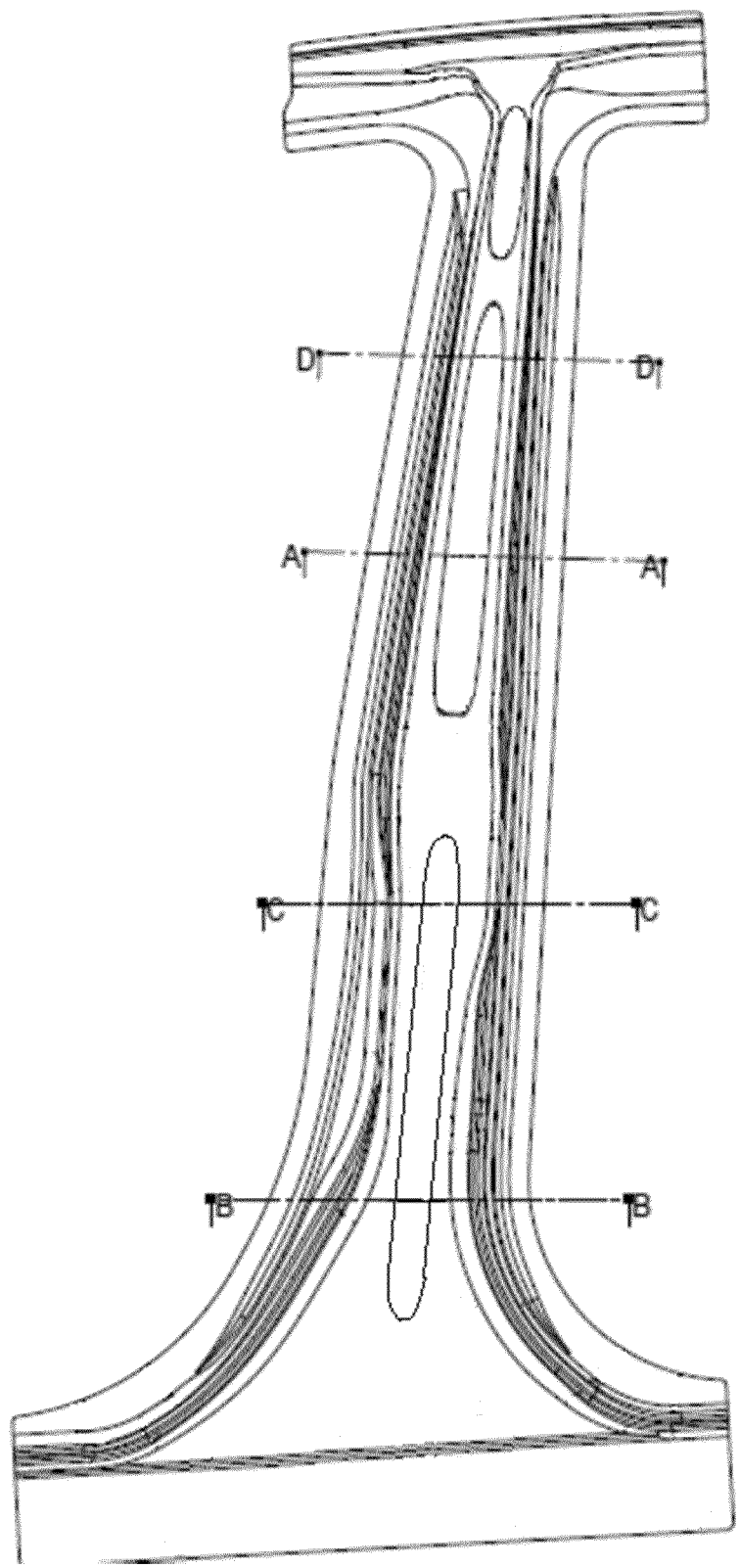
FIG. 3a schematically illustrates a further example of a central beam of a B-pillar.

FIG. 3a schematically illustrates another example of a central beam of a B-pillar according to another implementation. Various cross-sections along the lines indicated in FIG. 3a are shown in FIG. 3b.

Again, same reference signs as already indicated in previous figures have been used for indicating same or very similar components. Again, not in all the figures, all the reference signs have been included, in order not to obscure the drawings.

Figure 3B:
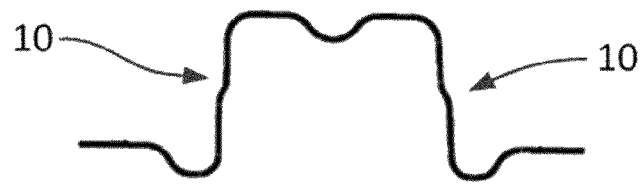
FIG. 3b schematically illustrates a number of cross-sections of the example of the central beam.
Figure 3B:
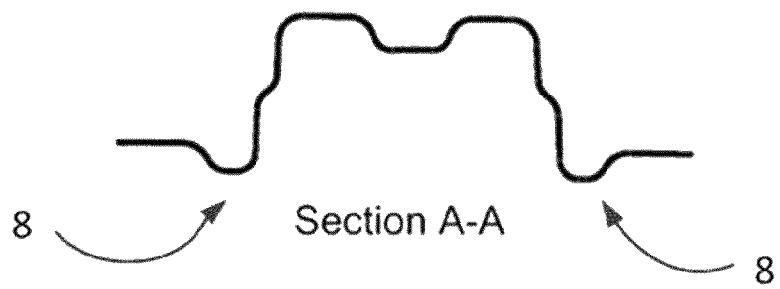
Figure 3B:
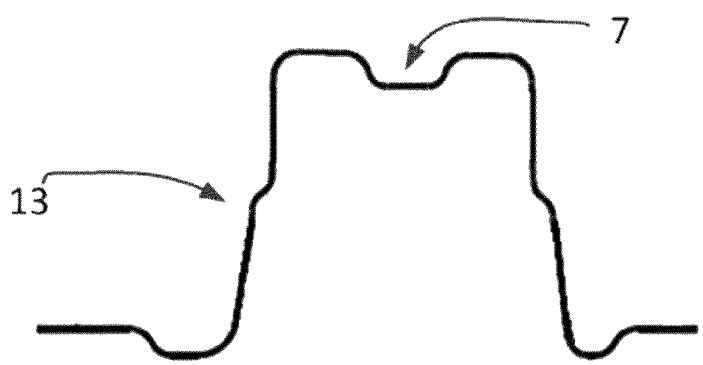
Figure 3B:
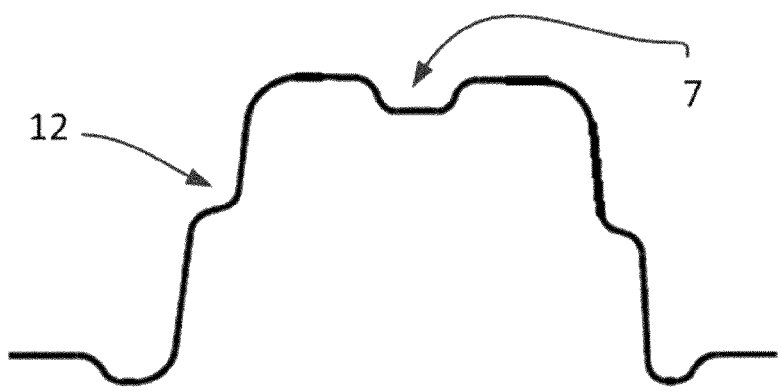

The sections A-A, B-B, C-C and D-D of FIG. 3b are generally quite comparable to the sections shown in previous figures. However, contrary to previous examples, the bottom portion of the U-shaped cross-sections C-C and B-B in this case may comprise a stiffening rib.

A further difference may be found in section C-C, wherein the side walls also incorporate side transition zones. In the previous examples, the side walls did not incorporate such transition zones, because a substantially flat side wall was necessary for mounting a car door lock. However, the current example serves to illustrate that depending on the specific implementation, and e.g. depending on the precise position of a door lock, variations are possible.

Figure 3C:
FIG. 3c schematically illustrates a number of cross-sections of a slightly modified central beam.
Figure 3C:
Figure 3C:
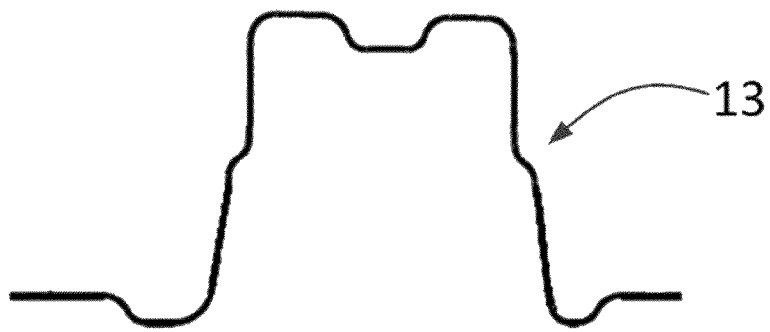
Figure 3C:
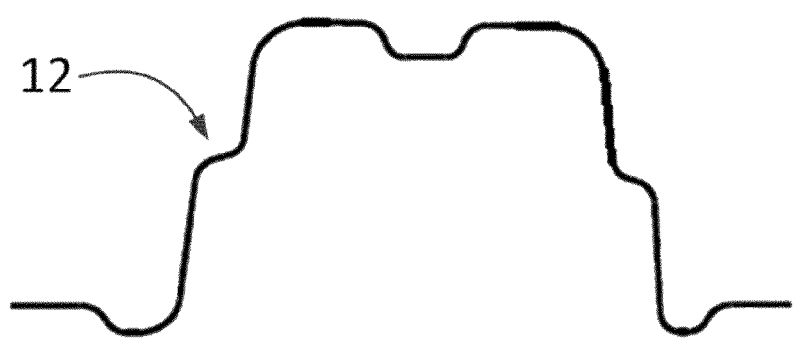

FIG. 3c schematically illustrates other possible cross-sections for a central beam of a B-pillar that is comparable to the beam illustrated in FIG. 3a. In the cross-sections D-D and A-A of FIG. 3c, it may be seen that these substantially U-shaped cross-sections do not incorporate side transition zones. Sections C-C and D-D do however incorporate transition zones in their side walls.

Inventors have found that in the case of a B-pillar, the incorporation of side transition zones along a portion of the lower half of the B-pillar has particularly advantageous effects. Along a lower half of a B-pillar, the B-pillar (due to structural requirements) may have substantially U-shaped cross-sections with higher side walls than along the upper half. These side walls may thus be more prone to buckling. For this reason, a side transition zone along the highest cross-sections is most effective for improving the deformation and kinematic behavior.

In some examples, side transition zones may be incorporated at least along a lower half of the central portion of the central B-pillar, i.e. between a lower widening portion (generally referred to as "gusset") of the central B-pillar and about 50% of the height of the B-pillar. In an example, the side transition zones may be incorporated at least along a portion extending at least between approximately 20% and approximately 50% of the height of the B-pillar, i.e. extending from a lower gusset up to half the height of the B-pillar.

Figure 4A:
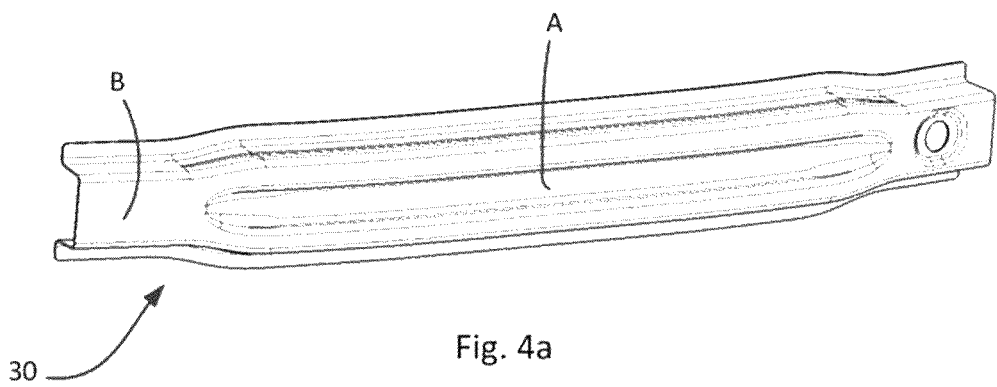
FIG. 4a schematically illustrates an example of a bumper beam according to an implementation.

FIG. 4a schematically illustrates a three-dimensional view of a bumper beam 30. Bumper beams may also have a substantially U-shaped cross-section. In this example, the cross-section is illustrated as an open section, but in other implementations, such a U-shape may be closed by an additional plate extending at least between the side flanges of the U-shape.

Figures 4B, 4C:
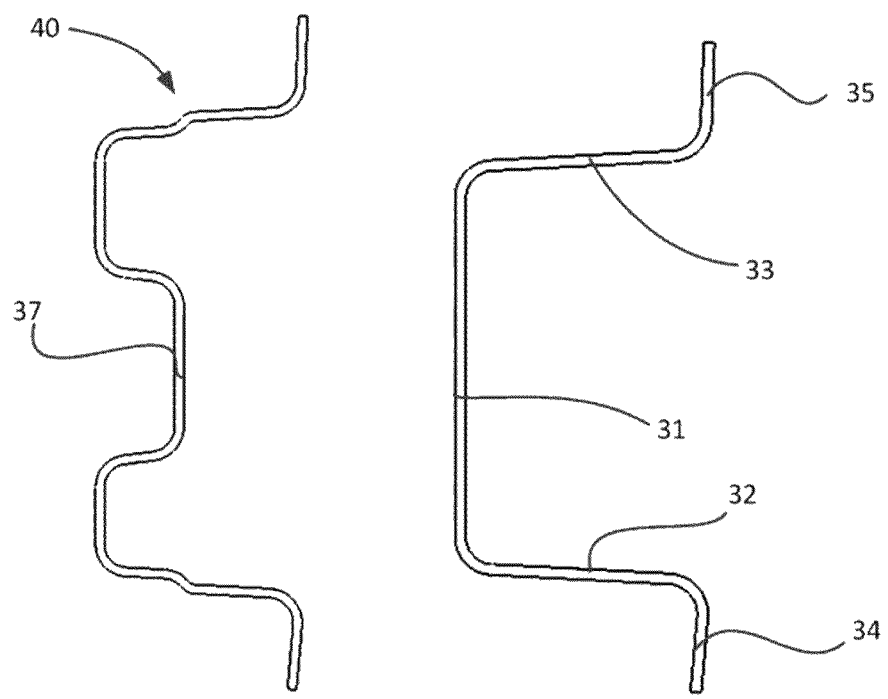

Central portion A and side portion B are schematically illustrated in FIG. 4a. FIG. 4b illustrates a cross-sectional view of a central portion A, whereas FIG. 4c illustrates a cross-sectional view of a side portion B.

With reference to FIG. 4c, a bottom portion 31, a first side wall 32, a second side wall 33, and side flanges 34 and 35 are illustrated. Along this portion of the bumper beam of this example, the side walls do not incorporate side transition zones.

A central portion of the bumper beam (FIG. 4b) however, does incorporate a side transition zone 40. The side transition zone 40 may be arranged at a height between 50-80%, particularly around a height of 70%. Herein 0% of the height is understood to be at the height of the side flanges and 100% is to be understood as the height of the bottom portion of the U-shape. The side transition zones in a bumper beam may generally have similar advantageous effects in a bumper beam as in a B-pillar.

Also visible in FIG. 4b is a stiffening rib (inwards protrusion) of the bottom portion 31 along a central portion of the bumper beam.

All illustrated examples of beams may advantageously be manufactured using hot stamping techniques. The cross-sections of the beams vary along their length, preferably in a substantially continuous manner. The non-constant cross-section along the length of the beam makes them particularly suitable for stamping.

Although only a number of examples have been disclosed herein, other alternatives, modifications, uses and/or equivalents thereof are possible. In particular, examples of beams have only been shown in connection with a B-pillar and in connection with a bumper beam. However, similar effects and advantages may be obtained when examples are implemented in other structural parts, such as e.g. a rocker panel, or a side impact beam. In general, the side transition zones as described in examples may preferably be provided along a stretch of at least 10% or at least 20% of the length of the beam of the structural part in question in order to significantly influence the buckling behaviour of the side walls.

Furthermore, all possible combinations of the described examples are also covered. Thus, the scope of the present disclosure should not be limited by particular examples, but should be determined only by a fair reading of the claims that follow.

The invention claimed is:

1. A beam comprising a first portion, a second portion, and a third portion, the first, second and third portions having a U-shaped cross-section, wherein the U-shaped cross section comprises a bottom and a first and a second side wall extending substantially perpendicular to the bottom, and wherein
    in the first and third portion, the first and/or the second side wall comprises a first substantially straight portion, a second substantially straight portion and a side transition zone between the first and the second substantially straight portions of the side wall, wherein
    the side transition zone comprises a substantially straight portion and wherein the first and second substantially straight portions of the side wall are substantially parallel to each other and the straight portion of the side transition zone is not parallel to the first and second substantially straight portions, wherein
    in the second portion, the first and second side walls do not have a side transition zone, and wherein
    in the first portion the side transition zone is arranged between 50-90% of a height of the side wall, and the straight portion of the side transition zone is inclined with respect to the bottom of the U-shaped cross section.

2. A beam according to claim 1, wherein the U-shaped cross-section further comprises a first side flange extending from the first side wall, and/or a second side flange extending from the second side wall.

3. A beam according to claim 2, wherein the first and/or the second side flange are substantially parallel to the bottom.

4. A beam according to claim 3, wherein the first and/or second side flange comprise a flange transition zone.

5. A beam according to claim 1, wherein the side transition zone comprises a first fillet radius at an end of the first substantially straight portion and a second fillet radius at an end of the second substantially straight portion.

6. A beam according to claim 1, wherein the side transition zone is arranged between 50-80% of the height of the side wall.

7. A beam according to claim 1, wherein the bottom comprises a stiffening rib.

8. A beam according to claim 1, wherein the first portion extends along at least 10% or along at least 20% of the length of the beam.

9. A beam according to claim 1, wherein the third portion extends along at least 10% or along at least 20% of the length of the beam.

10. A beam according to claim 6, wherein in the first portion, the side transition zone is arranged between 50-70%, or between 60-80% of the height of the side wall.

11. A beam according to claim 10, wherein the side transition zone is arranged at approximately 70% of the height of the side wall.

12. A beam according to claim 7, wherein the stiffening rib comprises a portion that is curved inwards.

13. A B-pillar comprising a central beam according to claim 1.

14. A B-pillar according to claim 13, wherein a lower half of the central beam comprises the first portion.

15. A vehicle comprising a B-pillar according to claim 14.

16. A bumper comprising a beam according to claim 1.

* * * * *